United States Patent [19]

Haydon

[11] 4,040,247

[45] Aug. 9, 1977

[54] CLOCK DRIVE APPARATUS

[75] Inventor: Arthur W. Haydon, Middlebury, Conn.

[73] Assignee: Tri-Tech, Inc., Waterbury, Conn.

[21] Appl. No.: 637,026

[22] Filed: Dec. 2, 1975

[51] Int. Cl.[2] ........................ G04C 3/00; G04C 13/04; H02M 7/00

[52] U.S. Cl. ................................ 58/23 R; 58/23 BA; 58/24 R; 58/25; 307/66; 318/138; 320/1

[58] Field of Search ............... 58/23 R, 23 A, 23 BA, 58/23 AC, 23 D, 24 R, 25, 152 H; 136/20; 307/64, 66; 318/138; 320/1

[56] References Cited

U.S. PATENT DOCUMENTS

| | | | |
|---|---|---|---|
| 3,479,812 | 11/1969 | Kramer | 58/25 |
| 3,643,420 | 2/1972 | Haydon | 58/24 R |
| 3,644,807 | 2/1972 | Zajac | 318/138 |
| 3,685,278 | 8/1972 | Haydon | 58/24 R |
| 3,690,059 | 9/1972 | Haydon | 58/24 R |
| 3,756,010 | 9/1973 | Kimura et al. | 58/23 R |
| 3,801,795 | 4/1974 | Zajac et al. | 307/66 |
| 3,881,951 | 5/1975 | McCoy | 136/20 |
| 3,889,461 | 6/1975 | Marti et al. | 58/25 |
| 3,902,311 | 9/1975 | Chacon et al. | 58/23 AC |
| 3,943,697 | 3/1976 | Fujita | 58/23 BA |

*Primary Examiner*—Stanley J. Witkowski
*Attorney, Agent, or Firm*—Lee C. Robinson, Jr.

[57] ABSTRACT

Apparatus for driving a timing device from an external AC power source and, in the event that the AC power source fails, from an auxiliary DC source. The driving apparatus includes a pulse producing circuit which produces periodic pulses in response to timing pulses. A timing pulse circuit, including an oscillator which produces an oscillating voltage having a frequency substantially proportional to the AC power source frequency, applies the timing pulses to the pulse producing circuit. A DC power supply receives the voltage which is supplied by the AC power source and generates a DC energizing voltage to energize the various circuits of the apparatus, including the pulse producing circuit and the oscillator. In the event that the AC power source fails, the voltage produced by the auxiliary DC source is used to energize the various circuits of the apparatus. A storage device is included in the DC power supply for receiving and storing the generated DC energizing voltage so as to maintain a sufficient energizing voltage during the interim between the failure of the AC power source and the time that the auxiliary DC source reaches a satisfactory energizing level. A driving circuit responds to the periodic pulses produced by the pulse producing circuit to supply driving energy to the timing device. The timing device comprises a single clock or clock system or, in the alternative, a master clock which is used to drive and control one or more slave clocks.

22 Claims, 1 Drawing Figure

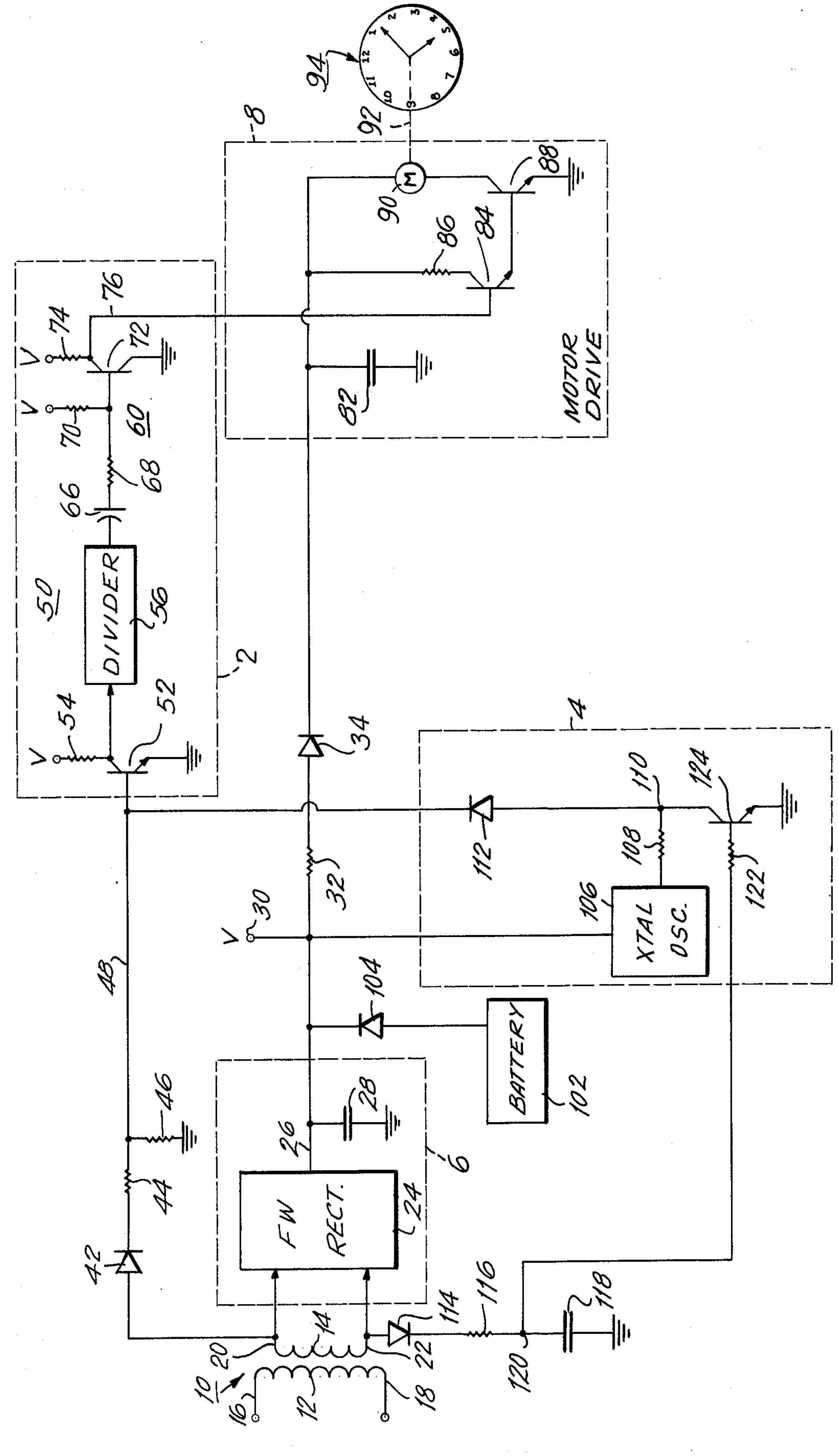
DIVIDER
MOTOR DRIVE
XTAL OSC.
BATTERY
FW RECT.
M

CLOCK DRIVE APPARATUS

BACKGROUND OF THE INVENTION

This invention relates to apparatus for driving a timing device and, more particularly, to such apparatus wherein the timing device is driven primarily from an external AC power source and, in the event that the AC power source fails, from an auxiliary DC source, such as a storage battery.

In many applications, a timing device, such as a clock or clock system, must maintain an accurate time indication during prolonged periods. For example, the clock system may comprise a master clock which is used to produce timing pulses for the control of plural slave clocks. This type of system is used in institutions and other facilities wherein it is desired to provide many time indicators, all of which are synchronized and all of which accurately indicate the correct time. As another example, the clock system may comprise but a single time indicator which necessarily should maintain and indicate accurate time.

In the foregoing, as well as other examples, it is advantageous to drive the timing device by electric motive power. Although this can be achieved by providing a local power supply together with various time generating and driving circuits, it is convenient to utilize the AC power which is commercially provided by utility companies. Virtually all of the major utility companies in the United States are members of a nationwide power network whose frequencies are maintained at 60Hz with a tolerance of ±0.2Hz on an instantaneous basis and a maximum accumulated error of ±0.25 cycles in 24 hours. This power network customarily holds any accumulated drift of the network frequency within these fixed limits by comparing the frequency with time signals from the National Bureau of Standards. Therefore, it is highly advantageous and economical to drive the timing device from commercially available utility power lines, provided that the timing device is synchronized with the power network frequency of 60Hz.

However, there always is the possibility of a failure in that part of the utility power system which is used to supply AC power to the timing device. In that event, not only is the source of driving energy interrupted but the timing information inherent in the 60Hz frequency also is interrupted. Consequently, the timing device which is powered from an external AC power source will be de-energized for the duration of the failure. It is desirable to account for this possibility of an AC power failure so as to continue to drive the timing device during such an interruption. Various proposals have been suggested to accomplish this alternative, or auxiliary, energization of the timing device. For example, a small inexpensive standby alternating current source can be provided to supply the necessary timing information and driving energy in the event that the external AC source fails. That is, a standby time base source can be used to supply driving energy and timing information to the timing device. Such a standby or auxiliary system is described in U.S. Pat. No. 3,643,420 which issued to Arthur W. Haydon on Feb. 22, 1972. The standby time base source generally may comprise a battery and suitable apparatus which is driven by the battery to supply the necessary timing information. Such circuitry may be constituted by a motor driven pulsing circuit or may comprise a conventional solid state oscillator. In any event, it has been thought heretofore that since long periods of time can transpire before an AC power source failure occurs, the relatively short "shelf-life" of commercially available batteries would require that the battery be of the rechargeable type. That is, since such batteries often could not maintain a sufficient charge to thus supply energy of a satisfactory level for long periods of time, it would be necessary to occasionally or periodically recharge the battery. This technique is described in U.S. Pat. No. 3,685,278 which issued to Arthur W. Haydon on Aug. 22, 1972.

Unfortunately, it has been found that the use of rechargeable batteries requires that a charge controlling circuit be provided. Also, the charging of a battery adds to the power requirements of the overall clock system. Accordingly, there has been a desire to avoid the use of rechargeable batteries, if possible.

Also, in the event of a failure of the AC power source, it is necessary that the local time base, or oscillator, provide the proper timing information substantially instantaneously. That is, the timing information provided by the local time base source must be synchronized with the AC power source frequency. Although synchronism generally can be properly maintained during normal operation by using the timing information derived from the AC power source as a synchronizing control signal, such synchronism cannot be readily maintained during the interruption of such timing information. Furthermore, many oscillating circuits which have been used heretofore as a time base source are not very stable over prolonged periods of time. That is, while the proper synchronism may be exhibited initially during a power failure, the local oscillator frequency and phase have a tendency to drift because of ambient temperature, wear, and the like, in the absence of the application of a synchronizing signal. Even the use of a calibrating circuit, such as is disclosed in U.S. Pat. No. 3,690,059 which issued to Arthur W. Haydon on Sept. 12, 1972, has not fully solved this problem of oscillator drift during periods of power interruptions.

OBJECTS OF THE INVENTION

Therefore, it is an object of the present invention to provide improved apparatus for driving a timing device from an external AC power source and, in the event of the failure of the AC source, from an auxiliary DC source.

It is another object of the present invention to provide apparatus for maintaining the proper time indications of a timing device during periods of an AC power failure by using a battery which need not be rechargeable.

Yet another object of this invention is to provide apparatus for driving a timing device during periods of an AC power failure by using a local crystal oscillator as a source of timing information, so as to maintain a substantially stable timing information source for prolonged power failure periods.

Yet another object of the present invention is to provide apparatus for driving a timing device from an external AC power source or from an auxiliary DC power source and which exhibits relatively low power requirements and is of relatively simple circuit construction.

A still further object of this invention is to provide apparatus for driving an externally powered timing device during periods of a power failure by using a battery having relatively long "shelf-life" and wherein a power storage device is provided to maintain adequate energy for the timing device during the interim required for the battery to reach a sufficiently high energizing level following the occurrence of a power failure.

Various other objects and advantages of the present invention will become apparent from the following detailed description and the novel features will be particularly pointed out in the appended claims.

SUMMARY OF THE INVENTION

In accordance with this invention, apparatus is provided for driving a timing device from an external AC power source and, in the event of the occurrence of a failure of the AC power source, from an auxiliary DC source, including a pulse producing circuit for producing periodic pulses in response to timing signals; a timing signal generator, including an oscillator for producing an oscillating voltage having a frequency substantially proportional to the AC power source frequency, for applying timing signals proportional to the AC power source frequency to the pulse producing circuit; a DC power supply for receiving the voltage supplied by the AC power source and for generating a DC energizing voltage to energize the driving apparatus, including the pulse producing circuit and the oscillator; a circuit responsive to the failure of the AC power source to supply the voltage produced by the auxiliary DC source as the DC energizing voltage; a voltage storage device included in the DC power supply for storing the generated DC energizing voltage so as to maintain a substantially uniform energizing voltage during the period following a power failure and the time required for the internal chemistry of the auxiliary DC source to reach a suitable voltage level; and a drive circuit responsive to the periodic pulses produced by the pulse producing circuit for supplying driving energy to the timing device.

The "timing device" is intended to refer to a single clock or to a clock system. The clock system is of the type wherein a master clock is provided and is driven so as to synchronously control a plurality of slave clocks. In one embodiment, the single clock, the master clock and/or the slave clocks are provided with suitable indicia to provide time indications. In an alternative embodiment, the master clock is not provided with such indicia, but the slave clocks are. The single clock or the master clock includes a motor which is driven by the timing information derived from the AC power source or from the oscillator. In a preferred embodiment, this motor comprises a stepping-type motor. In an alternative embodiment, this motor is a synchronous motor. By using a stepping motor, the power requirements of the driving apparatus are substantially reduced, and the system is capable of driving many slave clocks directly. A typical type of stepping motor which can be used is disclosed in U.S. Pat. No. 3,495,107 which issued to Arthur W. Haydon on Feb. 10, 1970. For the embodiment wherein a synchronous motor is used, the motor may be of the type disclosed in U.S. Pat. No. 3,495,113 which issued to Arthur W. Haydon on Feb. 10, 1970. This synchronous motor is more efficient than ordinary synchronous motors and normally requires 1 watt of alternating current to operate. Once started, the motor continues to run on ½ watt, or even less during a power failure.

The auxiliary DC power source is a battery which need not be of the rechargeable type. Recently, lithium and magnesium batteries have been introduced which exhibit a relatively long "shelf-life." As an example, these types of batteries are capable of providing suitable energizing voltages over long periods of nonuse. Hence, whereas rechargeable batteries have a shelf-life of about three years, lithium and magnesium batteries which now are available have a shelf-life of about ten years. However, due to the internal chemistry of these types of batteries, a finite time delay, or start-up interval, is required in order for the battery to supply the necessary energizing voltage of a satisfactory level. Conseqently, a voltage storage device is provided to maintain the proper DC energizing voltage previously derived from the AC power source until the battery output reaches a proper level.

Preferably, the oscillator which is used as a time base source to provide timing information during an AC power failure is a crystal oscillator. It is known that a crystal oscillator exhibits substantially stable operating characteristics over prolonged periods of time. That is, the output frequency and phase of such a crystal oscillator will exhibit minimum drift. Thus, accurate timing information is provided substantially instantaneously by the oscillator in the event of an AC power source failure.

BRIEF DESCRIPTION OF THE DRAWING

The following detailed description, given by way of example, will best be understood in conjunction with the accompanying drawing which schematically illustrates the apparatus which is used to drive the timing device.

DETAILED DESCRIPTION OF A CERTAIN ONE OF THE PREFERRED EMBODIMENTS

Referring now to the drawing, a schematic diagram of apparatus in accordance with the teachings of the present invention which is used for driving a timing device is illustrated. This apparatus is comprised of a transformer 10 which is adapted to be supplied by the external AC power source and, therefore, includes a pair of input lines 16 and 18 to which the AC voltage normally supplied by the utility company is applied. The transformer 10 includes a primary winding 12 coupled across the input conductors 16 and 18 and a secondary winding 14 to which output conductors 20 and 22 are connected. Preferably, the transformer 10 is a step-down transformer effective to reduce the voltage supplied by the AC power source to a lower, safe voltage level. For example, if the external AC power source is a standard 110–125 volt 60Hz utility line, the secondary winding 14 produces an output voltage of, say, 12 volts, but maintains the 60Hz frequency. Of course, the external AC power source may exhibit a different voltage and a different frequency, depending upon the particular application and environment of the illustrated apparatus.

A pulse producing circuit 2 is coupled to the conductor 20 of the secondary winding 14 and is adapted to receive a voltage proportional to the AC power source voltage so as to produce periodic pulses which are synchronized with the AC power source frequency. As will be described in greater detail hereinbelow, the pulse producing circuit 2 is comprised of a frequency divider 50 and a wave shaping circuit 60.

An oscillator 4 is adapted to produce an oscillating voltage having a frequency substantially proportional to the AC power source frequency. In one embodiment, the oscillator frequency is equal to the AC power source frequency. In another embodiment, the oscillator frequency is a multiple or fraction of the AC power source frequency. It is desirable that the oscillating voltage be substantially stable over prolonged periods of time. Accordingly, the oscillator 4 includes a crystal oscillating circuit 106. The crystal oscillating circuit 106 is connected to the pulse producing circuit 2 by an electronic switch, such as a diode 112, so that the output of the crystal oscillating circuit will be supplied to the pulse producing circuit in the event of an AC power source failure, as will be described.

Generally, because of the high stability of a crystal oscillating circuit, the circuit can be free-running and need not be synchronized to the AC power source frequency. It is preferred to prevent the output of the crystal oscillating circuit from being supplied to the pulse producing circuit unless and until the AC power source fails. To this effect, a transistor 124, such as a clamping transistor, is supplied with a clamping voltage derived from the secondary winding 14 and is connected in clamping relation to the crystal oscillating circuit 106. In an alternative embodiment, the transistor 124 is supplied with a control voltage and serves to synchronize the output of the crystal oscillating circuit with the AC power source frequency.

The conductors 20 and 22 are connected to a DC power supply 6 so that a suitable DC energizing voltage can be generated in response to the voltage supplied by the external AC power source. The DC power supply 6 includes a full wave rectifying circuit 24 for supplying a rectified DC voltage to an output conductor 26. If desired, conventional regulating circuitry and filter networks can be included in the full wave rectifier 24. The DC energizing voltage produced by the full wave rectifier is used as the energizing voltage for the crystal oscillating circuit 106 and for the pulse producing circuit 2. Accordingly, a DC voltage terminal 30 is coupled to the conductor 26 and is used to supply the energizing voltage V to the various circuit components, as is illustrated.

An auxiliary DC source 102 is connected to the conductor 26 and thence to the DC voltage terminal 30 by an electronic switching element, such as a diode 104. The auxiliary DC source preferably is a battery having a relatively long shelf-life. In the illustrated embodiment, the battery is of the lithium- or magnesium-type whose shelf-life is on the order of 10 years. The diode 104 serves to isolate the battery 102 during periods of nonuse. That is, when the apparatus is operating normally in response to the power supplied by the external AC power source, the diode 104 is reverse biased. However, in the event of a power failure, the diode 104 then is forward biased so as to supply the voltage produced by the battery 102 to the DC voltage terminal 30 as the energizing voltage for the illustrated circuit components.

It is recalled that the lithium or magnesium battery exhibits a finite start-up time. That is, an interim period exists between the time that the diode 104 is forward biased in response to an AC power source failure and the time that the battery chemistry provides a satisfactory level of energizing voltage. During this interim period, the DC energizing voltage which previously had been supplied by the full wave rectifier 24 is supplied by a storage capacitor 28. As shown, this storage capacitor 28 is connected between the conductor 26 and a reference potential, such as ground. Preferably, this capacitor 28 exhibits a very large capacitance value, on the order of 400Mf., and is seen to be charged substantially directly from the full wave rectifier. Hence, notwithstanding the relatively large capacitance value of the storage capacitor 28, this capacitor is provided with a relatively rapid charging time constant.

A motor drive circuit 8 is responsive to periodic pulses which are produced by the pulse producing circuit 2 so as to supply driving energy to a motor included in the timing device. The driving energy is derived from the DC energizing voltage which is supplied to the conductor 26 and to the DC voltage terminal 30. Accordingly, as shown, the motor drive circuit 8 is coupled to the conductor 26 for receiving the DC energizing voltage and is connected via a conductor 76 to the pulse producing circuit 2 in order to receive the periodic pulses. In the illustrated embodiment, the motor 90, which is included in the timing device and which has its output shaft 92 mechanically coupled to a time display indicator 94, is a stepping motor. Hence, driving energy need be supplied to this motor only during intermittent intervals so that the motor is incremented during such intervals that the drive energy is supplied. These intervals during which the stepping motor is incremented are defined by the periodic pulses produced by the pulse producing circuit 2. Accordingly, a switching element, such as a switching transistor 88, is connected in series with the motor 90 and is adapted to be actuated to its conducting state, or turned on, in response to each periodic pulse. This switching transistor 88 is driven by a further transistor 84, the latter being disposed to receive the periodic pulses and to supply them to the switching transistor. As shown, the transistor 84 is connected as a current amplifier to drive the switching transistor 88 to its conducting state. When the switching transistor 88 conducts, current is permitted to flow through the series circuit formed of the motor 90 and the collector-emitter circuit of the switching transistor.

Although the current which is supplied to the motor 90 as driving energy may be supplied directly from the conductor 26, it is preferable to provide a charge transfer capacitor 82 for supplying the driving energy to the motor 90. A circuit comprised of a resistor 32 and a diode 34 is interconnected between the conductor 26 and the charge transfer capacitor 82, as shown. Preferably, the charge transfer capacitor 82 exhibits a relatively large capacitance value, on the order of, say, 4000Mf. It is appreciated that this capacitance value, taken in conjunction with the resistance value of the resistor 32, results in a relatively high charging time constant for the capacitor 82. However, since the capacitor is connected so as to discharge through the motor 90 which is connected in series with the transistor 88, it is recognized that the charge transfer capacitor 82 is provided with a relatively small discharge time constant. Nevertheless, as will soon be explained, the charging time constant for the capacitor 82 is substantially less than the interval between successive periodic pulses.

The pulse producing circuit 2 now will be described in greater detail. The divider circuit 50 included in the pulse producing circuit 2 is comprised of a driving transistor 52 whose collector electrode is connected by a load resistor 54 to the power supply terminal 30, and is further connected to a plural stage divider network 56. The divider network 56 is of the type which is conventionally used in digital circuitry techniques and is adapted to divide the frequency of the signal supplied thereto by a factor of 3600. The frequency of the signal applied to the divider network 56 is equal to 60Hz, the AC power source frequency. Accordingly, as is shown, the voltage which is provided at the conductor 20 of the secondary winding 14 is half-wave rectified by a rectifier 42 and, after suitable voltage division provided by the voltage divider network formed of the resistors 44 and 46 is coupled via the conductor 48 to the transistor 52 and hence to the divider network 56. Thus, positive unipolar pulses having a frequency equal to the AC power source frequency are supplied to the transistor 52 which, in turn, supplies pulses of equal frequency to the divider network 56. With a divider ratio equal to 3600, it is appreciated that the divider network 56 produces output pulses at the rate of 1 pulse per minute. In an alternative embodiment, the divider ratio of the divider network 56 is equal to 60 so that the divider network produces output pulses at the rate of one pulse per second. Of course, other divider ratios can be used, as desired.

The pulses produced by the divider network 56 are of a substantially rectangular waveform. Although these pulses can be used to suitably drive a synchronous motor, it is preferred to modify this waveform so as to be compatible with the stepping motor 90 which is used. Accordingly, the wave shaping circuit 60 is connected to the divider network 56 to produce periodic pulses having a duration of about 100 milliseconds at the rate of one pulse per minute. Of course, other suitable pulse durations can be used depending upon the particular characteristics of the stepping motor. The illustrated wave shaping circuit 60 is comprised of a capacitor 66 connected to the divider network 56 so as to receive pulses therefrom. This capacitor is connected in series with a resistor 68 and a resistor 70 to the DC voltage terminal 30. The junction defined by the resistors 68 and 70 is connected to an output transistor 72. The transistor 72 has its collector electrode connected to the DC voltage terminal 30 via a load resistor 74. The collector electrode of the output transistor 72 is connected to the driving transistor 84 of the motor drive circuit 80 via the conductor 76.

When the output of the divider network 56 is relatively low, for example, ground potential, the capacitor 66 is charged through the charging circuit formed of the series-connected resistors 68 and 70. At this time, the transistor 72 may be assumed to be conducting in response to the voltage supplied to it by the resistor 70. Now, when a pulse is produced by the divider network so that its output now is relatively high, the capacitor 66 discharges to render the transistor 72 nonconductive. Subsequently, the transistor 72 again is rendered conductive by the voltage supplied through the resistor 70. The resistance values of the resistors 68 and 70 and the capacitance value of the capacitor 66 are suitably selected such that the output pulse supplied to the transistor 84 by the transistor 72 via the conductor 76 has a pulse width of about 100 milliseconds.

During normal operation, the full wave rectifier 24 is supplied with an AC voltage to produce a DC energizing voltage at the conductor 26 and at the DC voltage terminal 30. This energizing voltage rapidly charges the capacitor 28 and, through the resistor 32 and the diode 34 charges the capacitor 82 at a slow rate. When the pulse supplied to the conductor 76 by the transistor 72 is applied to the transistor 84 so as to trigger the switching transistor 88, the charged capacitor 82 now rapidly discharges through the motor 90 and the switching transistor 88. Thus, concurrent with the occurrence of each periodic pulse supplied to the conductor 76, an energy pulse is supplied to the stepping motor 90 to increment that motor. Since the discharge circuit for the capacitor 82 has a relatively small time constant, a sufficiently large amount of energy is rapidly supplied to the stepping motor to properly increment it. At the termination of the periodic pulse, the transistors 84 and 88 each are returned to their respective non-conductive states so as to electrically interrupt the discharge circuit for the capacitor 82. At this time, the capacitor 82 now is permitted to charge to the DC energizing voltage level through the resistor 32 and the diode 34. As mentioned hereinabove, this charging time for the capacitor 82 is substantially less than the interval between successive periodic pulses which are supplied to the transistors 84 and 88 by the transistor 72.

The crystal oscillating circuit 106 included in the oscillator 4 is a free-running oscillating circuit whose frequency is substantially equal to the frequency of the AC power source, according to one embodiment. In another embodiment, the oscillator frequency is proportional to the frequency of the AC power source. Crystal oscillating circuits are well known to those of ordinary skill in the art and, in the interest of brevity, further description of this circuit is not provided. Suffice it to say that DC energizing voltage is supplied to the crystal oscillating circuit from the DC voltage terminal 30 and the output of the crystal oscillating circuit is supplied through a resistor 108 to an oscillating output terminal 110. During normal operation, the clamping transistor 124 serves to clamp the output of the crystal oscillating circuit to a relatively low voltage, such as ground potential. It is expected that the unipolar pulses which are supplied to the conductor 48 will exhibit a greater magnitude than the clamped output at the output terminal 110 so that the diode 112 normally is reverse biased. Of course, in the event of an AC power source failure, there will be no unipolar pulses applied by the diode 42 to the conductor 48, and the clamping transistor 124 also will be deactuated. The diode 112 thus will be forward biased to supply the oscillating voltage produced by the crystal oscillating circuit 106 to the transistor 52 and thence to the divider network 56.

During normal operation of the illustrated apparatus, the voltage at the conductor 22 of the secondary winding 14 is half-wave rectified by the rectifier 114. Consequently, unipolar pulses of positive polarity are applied from the rectifier 114 through a resistor 116 to a junction 120. A capacitor 118 is connected between the junction 120 and ground in order to suitably filter the unipolar pulses which are applied to the junction so as to produce a DC clamping voltage. This clamping voltage is supplied through a current limiting resistor 122 to the clamping transistor 124, the latter being connected between the oscillating output terminal 110 and ground. It is appreciated that when the AC power source is operating, the transistor 124 is rendered conductive to clamp the output of the crystal oscillating circuit 106 to ground. Since one of the advantageous features of the crystal oscillating circuit 106 is its frequency stability, it is appreciated that the crystal oscillating circuit will oscillate at the proper frequency when the clamping transistor 124 no longer is energized, as during a power failure.

In view of the foregoing description of the illustrated apparatus, the manner in which the timing device is accurately driven now should be apparent. As has been discussed, the AC voltage applied to the transformer 10 is reduced in amplitude and is converted, by the full wave rectifier 24, into a DC energizing voltage. This DC energizing voltage is supplied to the DC voltage terminal 30 so as to provide a suitable energizing voltage for the respective elements included in the pulse producing circuit 2 and for the crystal oscillating circuit 106. Although not shown, it should be appreciated that the divider network 56 also is connected to the DC voltage terminal 30 in order to receive the DC energizing voltage. The DC energizing voltage applied to the conductor 26 is used to charge the storage capacitor 28 and, through the resistor 32 and the diode 34, to charge the charge transfer capacitor 82. Also, the timing information included in the supplied AC voltage is derived from the unipolar pulses produced by the diode 42 and supplied through the transistor 52 to the divider network 56. These unipolar pulses, produced at the rate of 60 pulses per second, are divided in frequency so that one pulse per minute is applied to the wave shaping circuit 60. This wave shaping circuit produces properly shaped pulses (e.g., 100 millisecond pulses) at the rate of 1 pulse per minute, and these shaped pulses are supplied over the conductor 76 to trigger the transistors 84 and 88. When the transistor 88 is triggered to its conductive state, the energizing voltage which is stored on the charge transfer capacitor 82 is applied to the stepping motor 90 to permit a current pulse to flow therethrough. Hence, the stepping motor is indexed at the rate of 1 increment per minute. Since the shaft 92 of the motor 90 is used to drive the timing device 94, the motor shaft is rotated by 6° in response to each applied pulse.

Once the capacitor 82 has discharged through the motor 90, it subsequently is charged with DC energizing voltage applied from the conductor 26 through the resistor 32 and the diode 34. In view of the circuit connections between the capacitors 28 and 82, the capacitor 82 is seen to discharge at a relatively faster rate than the capacitor 28. Hence, the voltage level across the capacitor 28 is only slightly disturbed during the energization of the motor 90.

While the unipolar pulses of alternate half-cycles of the input AC waveform are supplied to the pulse producing circuit 2, the input AC waveform also is supplied, through the rectifier-filter circuit comprised of the diode 114 and the resistor 116 and the capacitor 118 to the clamping transistor 124. This serves to clamp the output of the crystal oscillating circuit.

In an alternative embodiment, the clamping transistor is connected to the crystal oscillating circuit for the purpose of synchronizing the crystal oscillating circuit. In this alternative embodiment, unipolar pulses applied to the transistor 124 from the conductor 22 are used to periodically reset the crystal oscillating circuit so as to control its frequency and phase. Hence, the frequency and phase of the crystal oscillating circuit 106 are synchronized to that of the AC power source.

In the event of an AC power source failure, unipolar pulses no longer are applied by the diode 42 to the conductor 48, nor is the transistor 124 supplied with a voltage. Also, the full wave rectifier 24 is not supplied with an AC voltage, and thus does not produce a DC energizing voltage. Therefore, at this time, the respective diodes 104 and 112 are forward biased. This means that the oscillating voltage produced by the crystal oscillating circuit 106 is supplied from the oscillating junction 110 through the diode 112 to the transistor 52 and thence to the divider network 56. Also, during the interval required for the internal chemistry in the battery 102 to produce an output voltage of sufficient level, the DC energizing voltage which had been stored on the capacitor 28 is supplied to the DC voltage terminal 30 so as to supply a suitable DC energizing voltage to the crystal oscillating circuit 106 and to the respective active elements included in the pulse producing circuit 2. Hence, immediately following the AC power source failure, a proper DC energizing voltage level is maintained. Once the battery voltage has attained a sufficient level, the diode 104 is forward biased and the battery 102 supplies the DC energizing voltage to the DC voltage terminal 30. The illustrated apparatus now is capable of continued operation based upon the auxiliary power derived from the battery 102.

In view of the foregoing description, the advantages derived from the use of the charge transfer capacitor 82 now may be recognized. If the capacitor 82 is omitted, it would be necessary for the capacitor 28 to supply the necessary energy for the stepping motor 90. Let it be assumed that, immediately prior to the production of a pulse by the pulse producing circuit 2, an AC power source failure has occurred. The voltage stored on the capacitor 28 would have to supply the DC energizing voltage until the battery voltage has reached a sufficient level. If a pulse now is applied to the conductor 76 to trigger the transistors 84 and 88, the capacitor 28 will discharge through the motor 90 so that the stored voltage now will be further reduced. To avoid the possibility that this voltage is reduced below the minimum energy voltage level before the battery 102 attains a proper level, the charge transfer capacitor 82 is provided. Of course, if the time required for the battery 102 to reach the proper level is negligible or sufficiently small, the charge transfer capacitor 82 or the capacitor 28 can be omitted.

While the foregoing has described one preferred embodiment of the present invention, it is apparent that various changes and modifications in form and details may be made without departing from the spirit and scope of this invention. For example, the motor 90 need not be limited merely to a stepping motor. Rather, in an alternative embodiment, a synchronous motor is used. In this alternative embodiment, the pulses applied to the conductor 76 are used to control suitable drive circuitry for the synchronous motor. One example of such drive circuitry is disclosed in U.S. Pat. No. 3,690,059, mentioned hereinabove. In a still further embodiment wherein a synchronous motor is used, the wave shaping circuit 60 is replaced by drive circuitry compatible with the synchronous motor and responsive to the one pulse per minute which is produced by the divider network 56.

In a further modified embodiment, the crystal oscillating circuit 106 is comprised of a high frequency crystal oscillator connected to a frequency divider network. The frequency divider network is of a type which is conventionally used in digital circuit techniques, and may be similar to the divider network 56. This frequency divider functions to divide the high frequency produced by the crystal oscillator down to a much lower frequency, such as a frequency equal to the AC power source frequency.

In another embodiment, the crystal oscillating circuit 106 is synchronously driven by the AC voltage derived from the AC power supply, and the output of the crystal oscillating circuit is applied to the pulse producing circuit 2. Accordingly, the connection between the secondary winding 14 and the pulse producing circuit is omitted. In the event of an AC power source failure, the synchronous output from the crystal oscillating circuit continues to be applied to the pulse producing circuit; whereby the stepping motor 90 is driven without interruption.

Although not shown herein, the divider network 56 is adapted to be preset (or reset) to a predetermined, initial state when, for example, the apparatus is first energized, or when the time indication is adjusted to accommodate different time zones or different standards (e.g. standard time or daylight savings time), or the like. Such presetting (or resetting) of the divider network is preferred so that the time indicator can be properly synchronized with a time standard (such as from the National Bureau of Standards). This is achieved by providing the divider network with a reset terminal connected to a reset pulse generator which is actuable by, for example, manually operating a switch.

It is intended that the appended claims be interpreted as including the foregoing as well as various other changes and modifications.

What is claimed is:

1. Apparatus for driving a time indicator device from an AC power source, comprising voltage supply means including a rectifier circuit for receiving a voltage from said AC power source to produce a DC energizing voltage and a capacitor coupled to the output of said rectifier circuit for storing and maintaining said DC energizing voltage thereacross immediately following an AC power source failure; oscillator means normally energized by said DC energizing voltage to produce periodic timing pulses; an auxiliary DC source; means responsive to said failure of said AC power source for supplying the voltage produced by said auxiliary DC source to energize said oscillator means, and utilization means for receiving said periodic timing pulses and for providing an indication of time.

2. Apparatus in accordance with claim 1 wherein said utilization means comprises a stepping motor; and drive means normally energized with said DC energizing voltage produced by said voltage supply means for responding to said periodic timing pulses to drive said stepping motor.

3. Apparatus for driving a time indicating device from an AC power source, comprising voltage supply means for receiving a voltage from said AC power source to produce a DC energizing voltage; oscillator means including a crystal oscillator normally energized by said DC energizing voltage to produce periodic timing pulses; an auxiliary DC source; means responsive to a failure of said AC power source for supplying the voltage produced by said auxiliary DC source to energize said oscillator means including said crystal oscillator; a capacitor coupled to said voltage supply means adapted to receive and store said produced DC energizing voltage and to maintain said DC energizing voltage thereacross immediately following said AC power source failure; a stepping motor; and drive means normally energized with said produced DC energizing voltage for responding to said periodic timing pulses to drive said stepping motor.

4. Apparatus in accordance with claim 3 wherein said oscillator means further includes pulse producing means for receiving the voltage supplied by said AC power source to produce periodic pulses synchronized with the frequency of said AC power source; means for connecting said crystal oscillator to said pulse producing means; and means responsive to the voltage supplied by said AC power source for normally preventing the output of said crystal oscillator from being applied to said pulse producing means.

5. Apparatus for driving a time indicating device from an external AC power source and, in the event of the occurrence of a failure of said AC power source, from a battery, comprising pulse producing means for producing periodic pulses in response to timing signals applied thereto; means for normally deriving timing signals from said AC power source and applying same to said pulse producing means; oscillator means for producing timing signals equal to the frequency of said timing signals derived from said AC power source; DC supply means for receiving the voltage supplied by said AC power source and for generating a DC energizing voltage to energize said pulse producing means and said oscillator means; means for sensing the failure of said AC power source to supply the voltage produced by said battery as said DC energizing voltage to energize said pulse producing means and said oscillator means; means for normally inhibiting the timing signals produced by said oscillator means from being applied to said pulse producing means during normal operation of said AC power source and responsive to said failure of said AC power source to apply said timing signals produced by said oscillator means to said pulse producing means; a stepping motor included in said time indicating device; motor drive means including actuable switch means connected in series with said stepping motor; means for supplying said DC energizing voltage to the series connection of said actuable switch means and said stepping motor; and means for applying said periodic pulses to actuate said switch means so as to enable current to flow through said stepping motor.

6. Apparatus for driving timing means from an external AC power source and, in the event of the occurrence of a failure of said AC power source, from an auxiliary DC source, comprising pulse producing means for producing periodic pulses proportional to the frequency of said AC power source; oscillator means for producing an oscillating voltage having a frequency substantially equal to said frequency of said AC power source; DC supply means for receiving said voltage supplied by said AC power source and for generating a DC energizing voltage to energize said pulse producing means and said oscillator means; means responsive to said failure of said AC power source for supplying the voltage produced by said auxiliary DC source to energize said pulse producing means and said oscillator means and for supplying said oscillating voltage to said pulse producing means; voltage storage means included in said DC supply means for receiving and storing said generated DC energizing voltage and for maintaining a DC energizing voltage immediately following said AC power source failure; and drive means responsive to said periodic pulses for supplying driving energy to said timing means.

7. Apparatus for driving timing means from an external AC power source and, in the event of the occurrence of a failure of said AC power source, from an auxiliary DC source, comprising pulse producing means for producing periodic pulses proportional to the frequency of said AC power source, free-running oscillator means for producing an oscillating voltage having a frequency substantially equal to said frequency of said AC power source; means for clamping said oscillating voltage to a predetermined level throughout normal operation of said AC power source: DC supply means for receiving said voltage supplied by said AC power source and for generating a DC energizing voltage to energize said pulse producing means and said oscillator means; means responsive to said failure of said AC power source for supplying the voltage produced by said auxiliary DC source as said DC energizing voltage to energize said pulse producing means and said oscillator means and for supplying said oscillating voltage to said pulse producing means; a stepping motor included in said timing means; and drive means responsive to said periodic pulses for supplying stepping pulses of DC energy to said stepping motor.

8. Apparatus in accordance with claim 7 wherein said pulses of DC energy are derived from said DC energizing voltage.

9. Apparatus for driving timing means from an external AC power source and, in the event of the occurrence of a failure of said AC power source, from a battery, comprising pulse producing means for receiving the voltage supplied by said AC power source and for producing periodic pulses synchronized with the frequency of said AC power source; oscillator means for producing an oscillating voltage having a frequency substantially proportional to said frequency of said AC power source; DC supply means for receiving said voltage supplied by said AC power source and for generating a DC energizing voltage to energize said pulse producing means and said oscillator means; means for sensing the failure of said AC power source to supply the voltage produced by said battery as said DC energizing voltage to energize said pulse producing means and said oscillator means, and for supplying said oscillating voltage to said pulse producing means, said battery exhibiting a finite delay between the time said AC power source failure is sensed and the time the battery voltage reaches a predetermined energizing level; voltage storage means having a relatively fast charging time constant and a relatively slow discharging time constant included in said DC supply means for receiving and charging to the level of said generated DC energizing voltage and for maintaining a DC energizing voltage level during said finite delay; and drive means responsive to said periodic pulses for supplying driving energy to said timing means.

10. Apparatus for driving timing means from an external AC power source and, in the event of the occurrence of a failure of said AC power source, from a battery, comprising pulse producing means for receiving the voltage supplied by said AC power source and for producing periodic pulses synchronized with the frequency of said AC power source; oscillator means for producing an oscillating voltage having a frequency substantially proportional to said frequency of said AC power source; DC supply means for receiving said voltage supplied by said AC power source and for generating a DC energizing voltage to energize said pulse producing means and said oscillator means; means for sensing the failure of said AC power source to supply the voltage produced by said battery as said DC energizing voltage to energize said pulse producing means and said oscillator means; and to supply said oscillating voltage to said pulse producing means, said battery exhibiting a finite delay between the time said AC power source failure is sensed and the time the battery voltage reaches a predetermined energizing level; voltage storage means having a relatively fast charging time constant and a relatively slow discharging time constant included in said DC supply means for receiving and charging to the level of said generated DC energizing voltage and for maintaining a DC energizing voltage level during said finite delay; a stepping motor included in said timing means; and drive means responsive to said periodic pulses for supplying stepping pulses derived from said DC energizing voltage to said stepping motor.

11. Apparatus for driving timing means from an external AC power source and, in the event of the occurrence of a failure of said AC power source, from an auxiliary DC source, comprising pulse producing means for receiving the voltage supplied by said AC power source and for producing periodic pulses synchronized with the frequency of said AC power source; oscillator means for producing an oscillating voltage having a frequency substantially equal to said frequency of said AC power source; DC supply means for receiving said voltage supplied by said AC power source and for generating a DC energizing voltage to energize said pulse producing means and said oscillator means; means responsive to said failure of said AC power source for supplying the voltage produced by said auxiliary DC source as said DC energizing voltage to energize said pulse producing means and said oscillating means and for supplying said oscillating voltage to said pulse producing means; voltage storage means included in said DC supply means for receiving and storing said generated DC energizing voltage and for maintaining a DC energizing voltage immediately following said AC power source failure; drive means responsive to said periodic pulses for supplying driving energy to said timing means; and charge transfer means connected between said voltage storage means and said drive means for receiving said stored DC energizing voltage and for providing same as said driving energy.

12. Apparatus in accordance with claim 11 further comprising a drive motor included in said timing means; and wherein said drive means includes switch means actuated by said periodic pulses and connected in a series circuit including said charge transfer means and said drive motor to supply said DC energizing voltage provided by said charge transfer means to said drive motor when actuated.

13. Apparatus in accordance with claim 12 wherein said voltage storage means comprises a first capacitor and said charge transfer means comprises a second capacitor; said first capacitor being connected to said DC supply means through a charging circuit and to said second capacitor through a discharging circuit, the time constant of said discharging circuit being substantially greater than the time constant of said charging circuit.

14. Apparatus for driving timing means from an external AC power source and, in the event of the occurrence of a failure of said AC power source, from a battery, comprising pulse producing means for receiving the voltage supplied by said AC power source and for producing periodic pulses synchronized with the frequency of said AC power source; oscillator means for producing an oscillating voltage having a frequency substantially proportional to said frequency of said AC power source; DC supply means for receiving said voltage supplied by said AC power source and for generating a DC energizing voltage to energize said pulse producing means and said oscillator means; means for sensing the failure of said AC power source to supply the voltage produced by said battery as said DC energizing voltage to energize said pulse producing means and said oscillator means, and to supply said oscillating voltage to said pulse producing means, said battery exhibiting a finite delay between the time said AC power source failure is sensed and the time the battery voltage reaches a predetermined energy level; a voltage storage capacitor connected to said DC supply means through a first charging circuit for receiving and storing said generated DC energizing voltage; a stepping motor included in said timing means; motor drive means including actuable switch means connected in series with said stepping motor; a charge transfer capacitor connected to said voltage storage capacitor through a second charging circuit, said second charging circuit having a larger time constant than said first charging circuit; means for connecting said charge transfer capacitor to the series connection of said actuable switch means and said stepping motor; and means for applying said periodic pulses to actuate said switch means so as to supply the voltage on said charge transfer capacitor to said stepping motor.

15. Apparatus for driving timing means from an external AC power source and, in the event of a failure of said AC power source, from an auxiliary DC source, comprising divider means for receiving a periodic signal derived from the voltage supplied by said AC power source and for dividing the frequency of said periodic signal to produce periodic output pulses; oscillator means for producing an oscillating signal; means for supplying said oscillating signal to said divider means in the event of a failure of said AC power source; DC supply means for receiving said voltage supplied by said AC power source and for generating a DC energizing voltage to energize said divider means and said oscillator means; means responsive to said AC power source failure for supplying the voltage produced by said auxiliary DC source as said DC energizing voltage to energize said divider means and said oscillator means; voltage storage means included in said DC supply means for receiving and storing said generated DC energizing voltage and for maintaining a DC energizing voltage immediately following said AC power source failure; synchronizing means coupled to said oscillating means for substantially maintaining the frequency and phase of said oscillating signal in synchronism with said AC power source; and drive means responsive to said periodic output pulses for supplying driving energy to said timing means.

16. Apparatus in accordance with claim 15 wherein said synchronizing means comprises pulse producing means for receiving said voltage supplied by said AC power source and for producing unipolar pulses in response thereto; and switch means coupled to said oscillator means for controlling said oscillating signal in response to said unipolar pulses.

17. Apparatus for driving timing means from an external AC power source and, in the event of a failure of said AC power source, from an auxiliary DC source, comprising divider means for receiving a periodic signal derived from said AC power source and for dividing the frequency of said periodic signal to produce periodic output pulses; oscillator means for producing an oscillating signal; means coupled to said oscillator means and responsive to said AC power source for clamping the output of said oscillator means to a predetermined level; means for supplying said oscillating signal to said divider means in the event of a failure of said AC power source; DC supply means for receiving said voltage supplied by said AC power source and for generating a DC energizing voltage to energize said divider means and said oscillator means; means responsive to said AC power source failure for supplying the voltage produced by said auxiliary DC source as said DC energizing voltage to energize said divider means and said oscillator means; a motor included in said timing means; charge transfer means for receiving said DC energizing voltage and for supplying same as driving energy for said motor; and switch means connected in series with said motor and responsive to said periodic output pulses for periodically switching the DC energizing voltage received by said charge transfer means to said motor.

18. Apparatus in accordance with claim 17 further comprising voltage storage means included in said DC supply means for receiving and storing said generated DC energizing voltage to supply said stored DC voltage during the interim between the failure of said AC power source and the supply of the voltage produced by said auxiliary DC source; wherein said voltage storage means and said charge transfer means comprise first and second capacitors, respectively, interconnected by a circuit having a relatively high time constant such that said first capacitor is relatively rapidly charged by said generated DC energizing voltage, said second capacitor is relatively rapidly discharged through said motor, and said second capacitor is relatively slowly charged by said first capacitor.

19. Apparatus for driving timing means from an external AC power source and, in the event of the occurrence of a failure of said AC power source, from a lithium battery, comprising pulse producing means for receiving the voltage supplied by said AC power source and for producing periodic pulses synchronized with the frequency of said AC power source; oscillator means for producing an oscillating voltage having a frequency substantially proportional to said frequency of said AC power source; DC supply means for receiving said voltage supplied by said AC power source and for generating a DC energizing voltage to energize said pulse producing means and said oscillator means; means for sensing the failure of said AC power source to supply the voltage produced by said lithium battery as said DC energizing voltage to energize said pulse producing means and said oscillator means; means responsive to said failure of said AC power source to supply said oscillating voltage to said pulse producing means; a stepping motor included in said timing means; motor drive means including actuable switch means connected in series with said stepping motor; means for supplying said DC energizing voltage to the series connection of said actuable switch means and said stepping motor; and means for applying said periodic pulses to actuate said switch means so as to enable current to flow through said stepping motor.

20. Apparatus in accordance with claim 19 wherein said pulse producing means comprises divider means for receiving a periodic signal derived from the voltage supplied by said AC power source and for dividing the frequency of said periodic signal to produce said periodic pulses.

21. Apparatus in accordance with claim 20 wherein said oscillator means comprises a crystal oscillating circuit; and clamp means coupled to said crystal oscillating circuit and responsive to the voltage supplied by said AC power source for clamping the oscillating voltage generated by said crystal oscillating circuit.

22. Apparatus for driving a time indicating device from an external AC power source, comprising pulse producing means for producing periodic pulses in response to timing signals applied thereto; means including oscillator means for applying timing signals proportional to the frequency of said AC power source to said pulse producing means; DC supply means for receiving the voltage supplied by said AC power source and for generating a DC energizing voltage to energize said pulse producing means and said oscillator means; a capacitor coupled to the output of said DC supply means for storing and maintaining said DC energizing voltage thereacross immediately following an AC power source failure: a storage battery; means for sensing the failure of said AC power source to supply the voltage produced by said battery as said DC energizing voltage to energize said oscillator means; a stepping motor included in said time indicating device; motor drive means including actuable switch means connected to said stepping motor, means for supplying said DC energizing voltage to said actuable switch means during normal operation of said AC power source; and means for applying said periodic pulses to actuate said switch means so as to enable current to flow through said stepping motor during normal operation of said AC power source.

* * * * *